(12) United States Patent
Yoshida et al.

(10) Patent No.: US 11,646,154 B2
(45) Date of Patent: May 9, 2023

(54) COMPOSITE COMPONENT COMPRISING RING-SHAPED BONDED MAGNET AND METHOD OF MANUFACTURING THE SAME

(71) Applicant: NICHIA CORPORATION, Anan (JP)

(72) Inventors: Rie Yoshida, Anan (JP); Masahiro Abe, Anan (JP); Michiya Kume, Anan (JP); Kohei Ihara, Tokushima (JP); Shuichi Tada, Anan (JP)

(73) Assignee: NICHIA CORPORATION, Anan (JP)

( * ) Notice: Subject to any disclaimer, the term of this patent is extended or adjusted under 35 U.S.C. 154(b) by 65 days.

(21) Appl. No.: 17/303,571

(22) Filed: Jun. 2, 2021

(65) Prior Publication Data

US 2021/0287832 A1 Sep. 16, 2021

Related U.S. Application Data

(63) Continuation of application No. 15/965,300, filed on Apr. 27, 2018, now Pat. No. 11,056,255.

(30) Foreign Application Priority Data

Apr. 28, 2017 (JP) .............................. JP2017-089571
Apr. 5, 2018 (JP) .............................. JP2018-073347

(51) Int. Cl.
*H01F 1/053* (2006.01)
*H01F 7/02* (2006.01)
(Continued)

(52) U.S. Cl.
CPC ....... *H01F 1/0533* (2013.01); *B29C 45/0013* (2013.01); *C08L 77/02* (2013.01);
(Continued)

(58) Field of Classification Search
CPC ........ H01F 1/0533; H01F 1/059; H01F 1/083; H01F 1/113; H01F 7/02; H01F 41/0266; B29C 45/0013; C08L 77/02
See application file for complete search history.

(56) References Cited

U.S. PATENT DOCUMENTS

2007/0172164 A1  7/2007  Takada
2008/0199118 A1  8/2008  Yabe et al.
(Continued)

FOREIGN PATENT DOCUMENTS

CN    100437841 C  * 11/2008  ................ B22F 3/18
CN    105023683 A    11/2015
(Continued)

OTHER PUBLICATIONS

Machine translation of Yang, CN-100437841-C (Nov. 2008) (Year: 2008).*

(Continued)

*Primary Examiner* — Bernard Rojas
(74) *Attorney, Agent, or Firm* — Hunton Andrews Kurth LLP

(57) ABSTRACT

The present invention relates to a composite component including a metal component having a substantially cylindrical shape or a substantially annular shape, and a ring-shaped bonded magnet disposed on the outer periphery of the metal component, the ring-shaped bonded magnet containing a thermoplastic resin, magnetic particles, and rubber particles.

14 Claims, 1 Drawing Sheet

1. Metal component
2. Bonded magnet
3. Magnetic particle
4. Thermoplastic resin
5. Rubber
6. Rubber magnet particle

(51) Int. Cl.
*H01F 1/059* (2006.01)
*C08L 77/02* (2006.01)
*H01F 41/02* (2006.01)
*B29C 45/00* (2006.01)
*H01F 1/08* (2006.01)
*H01F 1/113* (2006.01)
*B29K 77/00* (2006.01)
*B29K 683/00* (2006.01)
*B29K 505/12* (2006.01)
*B29K 105/16* (2006.01)
*B29K 105/00* (2006.01)
*B29C 45/14* (2006.01)
*B22F 7/08* (2006.01)
*B22F 3/22* (2006.01)

(52) U.S. Cl.
CPC ............ *H01F 1/059* (2013.01); *H01F 1/083* (2013.01); *H01F 1/113* (2013.01); *H01F 7/02* (2013.01); *H01F 41/0266* (2013.01); *B22F 3/225* (2013.01); *B22F 7/08* (2013.01); *B22F 2998/10* (2013.01); *B29C 45/1459* (2013.01); *B29K 2077/00* (2013.01); *B29K 2105/0044* (2013.01); *B29K 2105/16* (2013.01); *B29K 2505/12* (2013.01); *B29K 2683/00* (2013.01); *B29K 2995/0008* (2013.01)

(56) References Cited

U.S. PATENT DOCUMENTS

| | | |
|---|---|---|
| 2016/0241096 A1 | 8/2016 | Mueller |
| 2017/0365387 A1 | 12/2017 | Kusawake et al. |

FOREIGN PATENT DOCUMENTS

| | | |
|---|---|---|
| CN | 102723165 B | 5/2016 |
| JP | S57-187910 A | 11/1982 |
| JP | H06-287445 A | 10/1994 |
| JP | 2940572 B2 | 8/1999 |
| JP | 2000323322 A | 11/2000 |
| JP | 2001068316 A | 3/2001 |
| JP | 2002078257 A | 3/2002 |
| JP | 2005072240 A | 3/2005 |
| JP | 2005151757 A | 6/2005 |
| JP | 2005237047 A | 9/2005 |
| JP | 2005241289 A | 9/2005 |
| JP | 2006041116 A | 2/2006 |
| JP | 2006329724 A | 12/2006 |
| JP | 2008172965 A | 7/2008 |
| JP | 2008309717 A | 12/2008 |
| JP | 2013244653 A | 12/2013 |
| JP | 2016101062 A | 5/2016 |
| JP | 2016143827 A | 8/2016 |
| JP | 2016533148 A | 10/2016 |

OTHER PUBLICATIONS

Non-Final Office Action, United States Patent and Trademark Office, issued to U.S. Appl. No. 15/965,300 dated Mar. 19, 2020, 9 pages.
Non-Final Office Action, United States Patent and Trademark Office, issued to U.S. Appl. No. 15/965,300 dated Sep. 18, 2020, 14 pages.
Notice of Allowance, United States Patent and Trademark Office, issued to U.S. Appl. No. 15/965,300 dated Mar. 29, 2021, 9 pages.

* cited by examiner

1. Metal component
2. Bonded magnet
3. Magnetic particle
4. Thermoplastic resin
5. Rubber
6. Rubber magnet particle

COMPOSITE COMPONENT COMPRISING RING-SHAPED BONDED MAGNET AND METHOD OF MANUFACTURING THE SAME

CROSS-REFERENCE TO RELATED PATENT APPLICATION

This is a continuation application of U.S. patent application Ser. No. 15/965,300, filed Apr. 27, 2018, which claims priority to Japanese Patent Application No. 2017-089571 filed on Apr. 28, 2017, and Japanese Patent Application No. 2018-073347 filed on Apr. 5, 2018. The disclosures of which all are incorporated by reference herein in their entireties.

BACKGROUND

Technical Field

The present invention relates to a composite component including a ring-shaped bonded magnet and a method of manufacturing the composite component.

Description of Related Art

Rotors provided with ring-shaped permanent magnets such as those described in JP 2016-101062 A are known as driving sources of fuel pumps for automobiles, motorcycles, or the like. In such components, a magnet is attached to a rotator that serves as a base made of a metal. For a method of attaching the magnet to the rotator, a method using adhesive force (e.g. by bonding) or mechanical fitting force (e.g. by shrink fitting or fastening) may be used.

For relatively small components, a technique of integrally molding a bonded magnet with a metal component is used mainly in view of cost reduction. However, the bonded magnet may crack due to differences in coefficient of linear expansion between the metal component and the bonded magnet material during a cooling step in the manufacturing process, during driving of the automobile or motorcycle, or during storage in cold climates. Thus, there is a need for composite components having good thermal cycle resistance. JP 2016-101062 A describes a composite component in which a ring-shaped permanent magnet has been molded integrally on the outer periphery of an annular metal component by injection-molding a magnetic powder, a thermoplastic resin, and a thermoplastic elastomer on the metal component.

JP 2002-78257 A describes that, when a plurality of sintered magnets are bonded to the outer surface of a metal rotor core, the magnetic poles are spaced apart from each other, which allows for reducing thermal stress between the rotor core and the magnets.

JP 2016-533148 T describes that a metal rotor core and a magnet are solder-bonded, and a plurality of slit recesses are provided in the surface of the rotor core to reduce thermal stress.

JP 2008-172965 A describes that, in forming an anisotropic bonded magnet surrounding a metal shaft, the positions of the welded part and the part between the magnetic poles, i.e., the magnetic-pole switching part, do not coincide.

JP 2006-41116 A describes that a bis-unsaturated fatty acid amide may be mixed into a polyamide, which is a base resin that is most-commonly used for bonded magnets, to improve flexibility so that the resulting molded product can exhibit enhanced thermal shock resistance.

JP H06-287445 A describes that a liquid rubber may be mixed into polyamide, which is a base resin, to reduce cracks due to mold shrinkage.

JP 2005-72240 A describes that materials having appropriately-selected aspect ratios may be combined to allow avoiding cracks or chips in the molded product.

JP 2005-151757 A describes that, when a bonded magnet is formed integrally on the outer periphery of a rotor, a middle layer may be provided between the rotor and the bonded magnet to form a bonded magnet made of a material with a high flexural strain to allow for avoiding cracks due to mold shrinkage or thermal cycles.

To counter cracking, these conventional techniques need to newly study the composition of resins or make a substantial review of the composition of magnet particles. This not only increases the cost but also requires examination on properties besides cracking resistance.

Therefore, it is desired that conventional materials are used to maintain properties such as magnetic properties, tensile properties, and adhesive strength while reducing cracking.

Meanwhile, JP 2016-143827 A describes a composite material including: a soft magnetic powder; a filler that contains a rubber particle and an outer peripheral layer disposed on the surface of the rubber particle and containing an organic material; and a resin part in which the soft magnetic powder and the filler are dispersed. In JP 2016-143827 A, the fillers containing the rubber particle are dispersed in the resin part, which allows for reducing propagation of microcrack. However, the filler needs to be subjected to an additional treatment such as surface treatment in order to be compatible with the resin. Moreover, in a ring-shaped bonded magnet molded integrally with a metal component as in the present invention, stress due to difference between the coefficient of linear expansion of the metal component and that of the bonded magnet is applied to the resin due to a thermal shock. Thus, a sufficient effect of absorbing such stress is not easily obtained by using the technique in which a rubber is dispersed in a resin in a state where the rubber is compatible with the matrix resin.

SUMMARY

The present invention provides a composite component including a ring-shaped bonded magnet having good thermal shock resistance, and a method of manufacturing the composite component.

According to an embodiment of the present invention, a composite component includes: a metal component having a substantially cylindrical shape or a substantially annular shape; and a ring-shaped bonded magnet disposed on an outer periphery of the metal component, the ring-shaped bonded magnet containing a thermoplastic resin, magnetic particles, and rubber particles.

According to another embodiment of the present invention, a method of manufacturing the composite component includes: kneading a thermoplastic resin with magnetic particles to obtain a compound; and integrally molding the compound and rubber particles with a metal component having a substantially cylindrical shape or a substantially annular shape.

Certain embodiments of the present invention allow for providing a composite component including a ring-shaped bonded magnet having good thermal shock resistance, and a method of manufacturing the composite component.

DETAILED DESCRIPTION

Hereinafter, certain embodiments of the present invention will be described. The embodiments described below are intended to give a concrete form to the technical idea of the present invention and are not intended to limit the scope of the present invention to the embodiments described below. When multiple substances correspond to a component included in a composition, "the amount of the component in the composition" as used in the present specification refers to the total amount of the multiple substances in the composition, unless otherwise stated.

Composite Component

Figure 2:
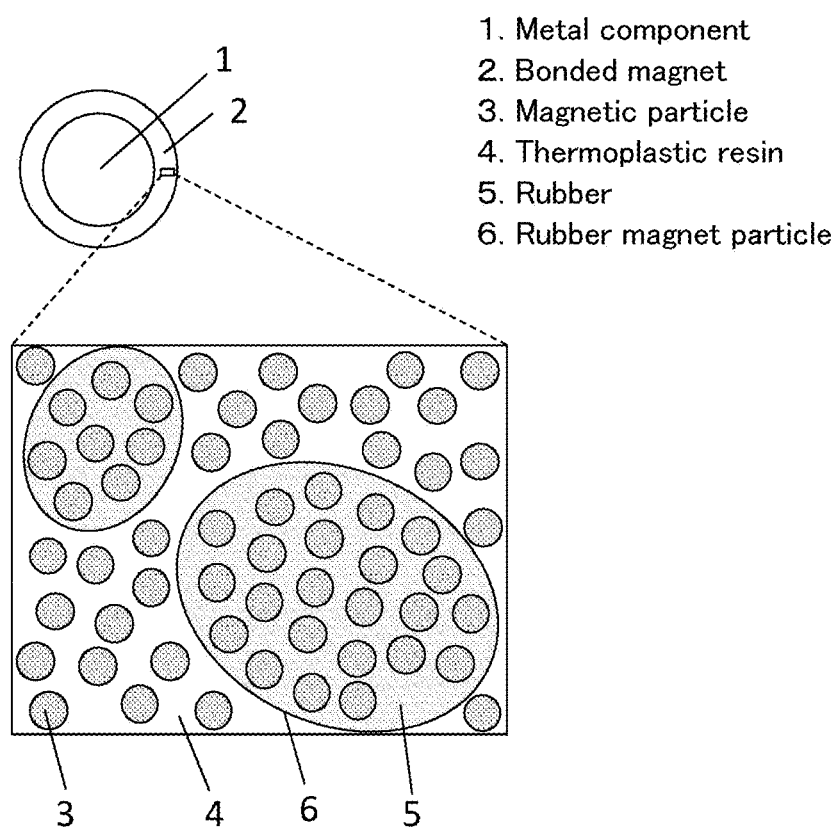
FIG. 2 shows a schematic diagram of a bonded magnet containing rubber magnet particles according to an embodiment of the present disclosure.

The composite component according to one embodiment of the present invention includes a metal component 1 having a substantially cylindrical shape or a substantially annular shape, and a ring-shaped bonded magnet 2 disposed on the outer periphery of the metal component (see FIG. 2). The ring-shaped bonded magnet contains a thermoplastic resin, magnetic particles, and rubber particles.

In conventional composite components including a ring-shaped bonded magnet disposed on the outer periphery of a metal component by thermal shock, stress due to difference between the coefficient of linear expansion of the metal component and that of the bonded magnet is applied to the resin, so that a crack may be easily generated in the bonded magnet. However on the other hand, according to an embodiment of the present invention, it is considered that the elastic component present as rubber particles allows for exhibiting sufficient rubber elasticity, and therefore can sufficiently reduce stress of expansion and contraction during thermal cycling.

The metal component may have any appropriate shape as long as it is a substantially cylindrical or substantially annular shape. The substantially cylindrical or substantially annular metal component preferably has an outer diameter of 5 mm or greater and 100 mm or less, and it preferably has a height of 1 mm or greater and 30 mm or less. A metal used for the metal component may be any appropriate metal that can serve as a yoke.

The composite component including a ring-shaped bonded magnet may also have any appropriate shape as long as it is a substantially cylindrical or substantially annular shape. The outer diameter of the composite component is preferably 6 mm or greater and 150 mm or less, and the height thereof is preferably 1 mm or greater and 30 mm or less.

Any appropriate material may be used for the thermoplastic resin, and examples thereof include polypropylene, polyethylene, polyvinyl chloride, polyester, polyamide, polycarbonate, polyphenylene sulfide, and acrylic resin. Among these, polyamide is preferable, and polyamide 12 is particularly preferable. Polyamide 12 is a crystalline resin having a relatively low melting point and a low water absorption rate, and thus shows good moldability. Moreover, these thermoplastic resins may be used in combination as appropriate.

It is preferable that the ring-shaped bonded magnet further contains a thermoplastic elastomer. With a thermoplastic elastomer, initial strength can be improved without impairing fluidity. Examples of the thermoplastic elastomer include polystyrene, polyolefin, polyester, polyurethane, and polyamide thermoplastic elastomers. These thermoplastic elastomers may be used in combination as appropriate. Preferred among these, polyamide thermoplastic elastomers having good chemical resistance are preferable.

The ring-shaped bonded magnet may further contain an antioxidant such as a phosphorus antioxidant. With a phosphorus antioxidant, changes in strength of the composite component over time can be reduced even under high temperature. Examples of the phosphorus antioxidant include tris(2,4-di-tert-butylphenyl)phosphite.

Examples of magnetic particles include ferrite magnetic particles and rare earth magnetic particles such as Nd—Fe—B based magnetic particles, Sm—Co based magnetic particles, and Sm—Fe—N based magnetic particles. Among these, Sm—Fe—N based magnetic particles are preferable. Sm—Fe—N based magnetic particles may be represented by $Sm_2Fe_{17}N_3$. Sm—Fe—N magnetic particles have stronger magnetic force than that of ferrite magnetic particles, and even relatively small quantities of Sm—Fe—N can provide high magnetic force. Sm—Fe—N magnetic particles have a smaller particle size than that of other rare earth magnetic particles such as Nd—Fe—B based magnetic particles and Sm—Co based magnetic particles, and thus are suitable as filler for the matrix resin, and are less likely to rust.

Anisotropic magnetic particles or isotropic magnetic particles, or a combination of these may be used for the magnetic particles. In order to obtain stronger magnetic properties, anisotropic magnetic particles are preferably used. In particular, Sm—Fe—N magnetic particles having anisotropy (anisotropic Sm—Fe—N magnetic particles) are preferably used. Because Sm—Fe—N-based magnetic particles have a strong magnetic force, using Sm—Fe—N-based magnetic particles for the magnetic particles allows for obtaining better magnetic properties.

The magnetic particles preferably have an average particle size of 10 μm or less, and the average particle size is more preferably 1 μm or greater and 5 μm or less. With an average particle size of 10 μm or less, defects such as irregularities and cracks on the surface of a product are less likely to occur, and thus the product has a good appearance. Moreover, the cost can also be reduced. An average particle size of more than 10 μm may lead to generation of irregularities and cracks on a surface of the product, resulting in a poor appearance. Meanwhile, with an average particle size of less than 1 μm, the cost of the magnetic particles increases, and thus is not preferable in view of cost reduction.

For the rubber particles, commercially available rubber particles or rubber particles prepared by cross-linking a rubber material and crushing it may be used. For the rubber material, any appropriate material may be used, but in view of thermal shock resistance, a rubber having a heat resistance of 120° C. or higher and a cold resistance of −40° C. or lower may preferably be used. Examples of the rubber material include silicone rubber (raw silicone rubber), fluororubber, and ethylene-vinyl acetate rubber, among which silicone rubber is particularly preferable in view of its appropriate flexibility, chemical stability, heat resistance, and cold resistance.

In view of magnetic flux density, it is preferable that at least some of the rubber particles are rubber magnet particles 6 containing magnetic particles 3 and rubber 5 (see FIG. 2). For the magnetic particles, magnetic particles as described above may be used. The amount of the magnetic particles in the rubber magnet particles is preferably 50% or greater and 99% or less by mass, and is more preferably 80% or greater and 98% or less by mass, to obtain high magnetic properties.

The average particle size of the rubber particles is determined as the particle size corresponding to the 50th percentile from the smallest particle size in a cumulative particle size distribution by volume determined under dry conditions using a laser diffraction particle size analyzer. The average particle size of the rubber particles is preferably greater than 0.7 µm and less than 1 mm, and in view of thermal shock resistance, it is more preferably 2 µm or greater and 900 µm or less, and in view of fluidity during molding, it is particularly preferably 11 µm or greater but 500 µm or less. In the case where the rubber particles include rubber magnet particles containing magnetic particles, in view of magnetic flux density, the average particle size of the rubber particles is preferably greater than 0.7 µm and less than 1 mm, more preferably 50 µm or greater and 900 µm or less, and in view of fluidity during molding, it is particularly preferably 100 µm or greater and 800 µm or less.

The amount of the magnetic particles in the ring-shaped bonded magnet is preferably 80% by mass or greater and 95% by mass or less, more preferably 90% by mass or greater and less than 95% by mass, to obtain high magnetic properties. The amount of the thermoplastic resin 4 in the ring-shaped bonded magnet 2 is preferably 3% by mass or greater and 20% by mass or less, more preferably 5% by mass or greater and 15% by mass or less, to ensure fluidity. In the case where the ring-shaped bonded magnet further contains a thermoplastic elastomer, the amount of the thermoplastic elastomer in the ring-shaped bonded magnet is preferably such that the ratio by mass of the thermoplastic resin to the thermoplastic elastomer is in a range of 90:10 to 50:50, and more preferably in a range of 90:10 to 70:30 to obtain shock resistance. In the case where the ring-shaped bonded magnet further contains a phosphorus antioxidant, the amount of the phosphorus antioxidant in the ring-shaped bonded magnet is preferably 0.1% by mass or greater and 2% by mass or less. The amount of the rubber particles in the ring-shaped bonded magnet is preferably 0.3% by mass or greater and 10% by mass or less, more preferably 0.5% by mass or greater and 5.5% by mass or less, in view of thermal shock resistance. In the case where the rubber particles contain no magnetic material, the amount of the rubber particles is further preferably 0.3% by mass or greater and 1.0% by mass or less. In the case where the rubber particles contain rubber magnet particles containing a magnetic material, the amount of the rubber particles is further preferably 0.3% by mass or greater and 10% by mass or less.

Method of Manufacturing Composite Component

The method of manufacturing the composite component according to the present invention includes kneading a thermoplastic resin and magnetic particles to obtain a compound, and integrally molding the compound and rubber particles with a substantially cylindrical or substantially annular metal component.

In the present embodiment, a compound containing a thermoplastic resin and magnetic particles is provided separately from rubber particles. If rubber particles are kneaded with a thermoplastic resin and magnetic particles to prepare a compound, the rubber particles are exposed to heat both in the preparation of the compound and in the integral molding, which may lead to decrease in elasticity or strength of the rubber particles. Moreover, the metering torque during the molding will be increased, so that molding temperature is required to be increased. The increase in molding temperature can cause deterioration of the thermoplastic resin, which may result in reduction in thermal shock resistance. In contrast, in the present embodiment, the rubber particles are exposed to heat only at the time of integral molding, the properties of the rubber particles are less likely to deteriorate. Thus, the composite component to be obtained can maintain the elasticity and strength of the rubber particles.

Providing Compound

In the step of kneading a thermoplastic resin with magnetic particles to obtain a compound, the compound can be obtained by sufficiently kneading a thermoplastic resin and magnetic particles, feeding the kneaded mixture into a kneading machine such as a single-screw or twin-screw kneading machine, cooling, and then cutting into an appropriate size. The thermoplastic resin and the magnetic particles are as described above.

A thermoplastic elastomer and/or an antioxidant such as a phosphorus antioxidant may be simultaneously kneaded with the thermoplastic resin and magnetic particles.

The amount of the magnetic particles in the compound is preferably 80% by mass or greater and 95% by mass or less, and is more preferably 90% by mass or greater and 95% by mass or less to obtain high magnetic properties. The amount of the thermoplastic resin in the compound is preferably 3% by mass or greater and 20% by mass or less, and is more preferably 5% by mass or greater and 15% by mass or less to ensure fluidity. In the case where the compound further contains a thermoplastic elastomer, the ratio by mass of the thermoplastic resin to the thermoplastic elastomer is preferably in a range of 90:10 to 50:50, and more preferably in a range of 90:10 to 70:30 in view of shock resistance. In the case where the compound further contains a phosphorus antioxidant, the amount of the phosphorus antioxidant in the compound is preferably 0.1% by mass or greater and 2% by mass or less.

Providing Rubber Particles

For the rubber particles, rubber particles that are commercially available may be used. Alternatively, the rubber particles may be prepared as follows: a rubber material and a vulcanizing agent and a crosslinking agent that are appropriate for the rubber material are kneaded in a kneading machine such as a mixing roll, kneader, or Banbury mixer, and the kneaded mixture is fed into an extruder to obtain a string-like molding, which is then optionally heat-cured and cooled, followed by crushing into the desired size, so that rubber particles can be obtained.

In view of magnetic flux density, it is preferable that at least some of the rubber particles are rubber magnet particles containing magnetic particles. In the method of manufacturing the rubber magnet particles, magnetic particles, a rubber material, and vulcanizing and crosslinking agents appropriate for the rubber material are kneaded using a kneading machine such as a mixing roll, kneader, or Banbury mixer, the kneaded mixture is fed into an extruder to obtain a string-like molding, which is then optionally heat-cured and cooled, followed by crushing into the desired size, so that rubber magnet particles can be obtained. The magnetic particles and the rubber material are as described above. The expression "at least some of the rubber particles are rubber magnet particles containing magnetic particles" includes both the case where rubber magnet particles and rubber particles that do not contain a magnetic material are mixed, and the case where all of the rubber particles contain magnet particles.

Molding

In the step of integrally molding the compound and rubber particles with a substantially cylindrical or substantially annular metal component, a substantially cylindrical or substantially annular metal component is placed in a mold of an injection molding machine, the compound and rubber particles are fed into the injection molding machine, and then integral injection molding is performed.

The rubber particles may be contained at any appropriate ratio by mass with respect to the compound, but the amount of the rubber particles is preferably 0.3 parts by mass or greater and 10 parts by mass or less, more preferably 0.5 parts by mass or greater and 5.5 parts by mass or less, per 100 parts by mass of the compound. An amount of lower than 0.3 parts by mass tends to lead to insufficient thermal shock resistance. An amount of higher than 10 parts by mass tends to lead to reduction in magnetic flux density. In the case where the rubber particles contain no magnetic particles, the amount of the rubber particles per 100 parts by mass of the compound is further preferably 0.3 parts by mass or greater and 1.0 parts by mass or less. In the case where the rubber particles are rubber magnet particles containing magnetic particles, the amount of the rubber particles per 100 parts by mass of the compound is further preferably 0.3 parts by mass or greater and 10 parts by mass or less.

The composite component according to certain embodiments of the present invention can be used in rotors including ring-shaped permanent magnets and in other driving sources of fuel pumps for vehicles such as automobiles and motorcycles.

EXAMPLES

Hereinafter, certain examples of the present invention are described in detail. The average particle size was determined as the particle size corresponding to the 50th percentile from the smallest particle size in a cumulative particle size distribution by volume determined using a laser diffraction particle size analyzer (HELOS & RODOS from Japan Laser Corporation).

The following materials were used in the examples below.
Magnetic particles: anisotropic Sm—Fe—N based magnetic material (average particle size: 3 μm)
Thermoplastic resin: polyamide 12
Rubber particles A: Tospearl 120, which is silicone rubber fine particles (average particle size: 2 μm) available from Momentive Performance Materials Inc.
Rubber particles B: Tospearl 145, which is silicone rubber fine particles (average particle size: 4.5 μm) available from Momentive Performance Materials Inc.
Rubber particles C: Tospearl 1110, which is silicone rubber fine particles (average particle size: 11 μm) available from Momentive Performance Materials Inc.
Rubber particles D: Tospearl XC99-A8808, which is silicone rubber fine particles (average particle size: 0.7 μm) available from Momentive Performance Materials Inc.

Example 1

The Sm—Fe—N magnetic material was surface-treated with ethyl silicate and a silane coupling agent. The surface-treated Sm—Fe—N based magnetic material (91% by mass) and polyamide 12 (9% by mass) were mixed using a mixer. The mixed powder was kneaded at 220° C. using a twin-screw kneading machine, cooled, and then cut into an appropriate size to obtain a pellet-shaped compound.

The compound (100 parts by mass) and the rubber particles A (0.5 parts by mass) were fed into an injection molding machine. An annular metal component (φ14 mm (outer diameter)×20 mm (height)) was inserted into the mold, and the compound and the rubber particles were then injection-molded into a mold cavity surrounding the outer periphery of the metal component so as to be integrated with the metal component, so that a ring-shaped bonded magnet was formed on the outer periphery of the metal component. The outer diameter of this composite component was φ21 mm. The injection molding was carried out while applying a magnetic field along the radial direction of the ring-shaped bonded magnet that had been formed.

Example 2

A composite component was prepared as in Example 1, except that the rubber particles B were used instead of the rubber particles A.

Example 3

A composite component was prepared as in Example 1, except that the rubber particles C were used instead of the rubber particles A.

Example 4

A composite component was prepared as in Example 1, except that the rubber particles D were used instead of the rubber particles A.

Comparative Example 1

A composite component was prepared as in Example 1, except that no rubber particles were used.

Evaluation 1: Thermal Shock Test

Each cycle of the 32 cycles was performed for 15 minutes at −40° C., for 2 hours at 160° C., and for 1 minute to reach 160° C. or −40° C. by switching a damper. In this test, an accelerated aging test was performed to observe whether any crack could occur after 500 cycles in an actual use environment at a temperature ranging from −40° C. to 120° C. This means that, according to the rule that the reaction rate doubles for every 10° C. increase in temperature, aging was accelerated by a factor of the fourth power of two in this test. From the equation: 500 cycles/$2^4$=31.25, the appearance of the rotor was observed after 32 cycles in this test, the number of rotors with no cracks was counted, and the number of cracked samples was determined. The results are shown in Table 1.

Evaluation 2: Magnetic Flux Density Br

A cylindrical bonded magnet having a diameter of φ10 mm and a height of 7 mm was produced using the compound and rubber particles used in each of the examples and comparative example. The magnetic flux density Br was measured using a BH curve tracer (Riken Denshi Co., Ltd). The magnetic flux density Br values were compared to Comparative Example 1, which was taken as 100. The results are shown in Table 1.

TABLE 1

|  |  | Example 1 | Example 2 | Example 3 | Example 4 | Comparative Example 1 |
|---|---|---|---|---|---|---|
| (A) Compound | Magnetic powder | | | $Sm_2Fe_{17}N_3$ | | |
| | Resin | | | PA 12 | | |
| (B) Rubber particles | Rubber | Silicone rubber | Silicone rubber | Silicone rubber | Silicone rubber | — |
| | Size | 2 μm | 4.5 μm | 11 μm | 0.7 μm | — |
| Ratio (A)/(B) (w/w) | | 100/0.5 | 100/0.5 | 100/0.5 | 100/0.5 | — |
| Timing to add (B) to (A) | | Injection molding | Injection molding | Injection molding | Injection molding | — |
| Thermal shock resistance | Number of cracked samples | 0/10 | 0/10 | 0/10 | 3/10 | 10/10 |
| Magnetic flux density | Br (%) | 98 | 98 | 97 | 95 | 100 |

Table 1 shows that the composite components of Examples 1 to 4 containing rubber particles exhibited improved thermal shock resistance as compared with Comparative Example 1, while preventing decrease in magnetic flux density Br.

Example 5

A compound was prepared as in Example 1. 0.1% by mass of an addition-type vulcanizing agent, 0.4% by mass of a crosslinking agent, and 77.5% by mass of a surface-treated Sm—Fe—N magnetic material were added to 22% by mass of a raw silicone rubber (cold resistance: −120° C., heat resistance: 280° C.), and they were uniformly mixed in an extruder. The mixture was then molded into a string-like shape having a diameter of approximately 2 mm or greater and 4 mm or less using the extruder, and then heat-treated at 150° C. for two hours to obtain a silicone rubber magnet. Subsequently, the rubber magnet was crushed in liquid nitrogen to obtain rubber magnet particles having an average particle size of 150 μm. Then, a composite component was obtained in a manner as in Example 1, except that the compound and the rubber particles were fed into the injection molding machine at a ratio of 5.0 parts by mass of the rubber magnet particles to 100 parts by mass of the compound.

Example 6

A composite component was obtained in a manner as in Example 5, except that rubber magnet particles having an average particle size of 300 μm were obtained.

Example 7

A composite component was obtained in a manner as in Example 5, except that rubber magnet particles having an average particle size of 500 μm were obtained.

Example 8

A composite component was obtained in a manner as in Example 5, except that rubber magnet particles having an average particle size of 1 mm were obtained.

Comparative Example 2

Rubber magnet particles were obtained in a manner as in Example 5. A compound was obtained as in Example 1, except that 91% by mass of the Sm—Fe—N magnetic material surface-treated in a manner as in Example 1, 9% by mass of polyamide 12, and the obtained rubber magnet particles having an average particle size of 150 μm in an amount equivalent to the amount added in Example 5 were mixed using a mixer, and the mixed powder was kneaded in a twin-screw kneading machine at 240° C. The compound was injection molded as in Example 1 to obtain a composite component.

The thermal shock resistance and the magnetic flux density Br of Examples 5 to 8 and Comparative Example 2 were determined as described above. The results are shown in Table 2.

TABLE 2

|  |  | Example 5 | Example 6 | Example 7 | Example 8 | Comparative Example 2 |
|---|---|---|---|---|---|---|
| (A) Compound | Magnetic powder | | | $Sm_2Fe_{17}N_3$ | | |
| | Resin | | | PA 12 | | |
| (B) Rubber magnet particles | Magnetic powder | | | $Sm_2Fe_{17}N_3$ | | |
| | Rubber | | | Silicone rubber | | |
| | Size | 150 μm | 300 μm | 500 μm | 1 mm | 150 μm |
| Ratio (A)/(B) (w/w) | | 100/5 | 100/5 | 100/5 | 100/5 | 100/5 |
| Timing to add (B) to (A) | | Injection molding | Injection molding | Injection molding | Injection molding | Kneading of (A) |
| Thermal shock resistance | Number of cracked samples | 0/10 | 0/10 | 0/10 | 5/10 | 5/10 |
| Magnetic flux density | Br (%) | 100 | 101 | 100 | 97 | 99 |

Table 2 shows that the composite components of Examples 5 to 8 containing rubber magnet particles exhibited improved thermal shock resistance as compared with Comparative Example 1 in Table 1, while maintaining the magnetic flux density Br. Moreover, a comparison between Example 5 and Comparative Example 2 using the same rubber magnet shows that Example 5 had an improved thermal shock resistance. In Comparative Example 2, rubber magnet particles were added to the compound at the time of kneading of the compound, which would lead to an increase in metering torque during the injection molding. Accordingly, the molding temperature needed to be increased. Thus, it is considered that the high temperature deteriorated the thermoplastic resin, resulting in reduction in thermal shock resistance. Further, the increase in pressure by about 20% during the injection molding was considered to be due to the increase in hardness of the rubber, which was caused by secondary curing of the silicone rubber during the kneading of the compound and the rubber magnet particles.

Example 9

The Sm—Fe—N magnetic material was surface-treated with ethyl silicate and a silane coupling agent. 91% by mass of the surface-treated Sm—Fe—N magnetic material, 7% by mass of polyamide 12, and 2% by mass of a polyamide elastomer were mixed using a mixer to obtain a mixed powder. The mixed powder was kneaded at 220° C. in a twin-screw kneading machine, cooled, and then cut into an appropriate size to obtain a pellet-shaped compound. The obtained compound and rubber particles as in Example 1 were injection-molded in a manner as in Example 1 to obtain a composite component.

Example 10

The compound obtained in Example 9 and rubber particles as in Example 2 were injection-molded in a manner as in Example 1 to obtain a composite component.

Example 11

The compound obtained in Example 9 and rubber particles as in Example 3 were injection molded in a manner as in Example 1 to obtain a composite component.

Comparative Example 3

The compound obtained in Example 9 was injection-molded as in Example 1 to obtain a composite component.

The thermal shock resistance and the magnetic flux density of Examples 9 to 11 and Comparative Example 3 were determined as described above. The results are shown in Table 3.

TABLE 3

|  |  | Example 9 | Example 10 | Example 11 | Comparative Example 3 |
|---|---|---|---|---|---|
| (A) Compound | Magnetic powder | $Sm_2Fe_{17}N_3$ | | | |
|  | Resin | PA 12 | | | |
|  |  | PA elastomer | | | |
| (B) Rubber particles | Rubber | Silicone rubber | | | |
|  | Size | 2 μm | 4.5 μm | 11 μm | — |
|  | Ratio (A)/(B) (w/w) | 100/0.5 | 100/0.5 | 100/0.5 | — |
|  | Timing to add (B) to (A) | Injection molding | Injection molding | Injection molding | — |
| Thermal shock resistance | Number of cracked samples | 0/10 | 0/10 | 0/10 | 1/10 |
| Magnetic flux density | Br (%) | 91 | 92 | 90 | 92 |

Table 3 shows that the composite components of Examples 9 to 11 containing rubber particles exhibited improved thermal shock resistance as compared with Comparative Example 3, while preventing decrease in magnetic flux density.

Example 12

The compound obtained in Example 9 and rubber magnet particles as in Example 5 were injection-molded in a manner as in Example 1 to obtain a composite component.

Example 13

The compound obtained in Example 9 and rubber magnet particles as in Example 6 were injection-molded in a manner as in Example 1 to obtain a composite component.

Example 14

The compound obtained in Example 9 and rubber magnet particles as in Example 7 were injection-molded in a manner as in Example 1 to obtain a composite component.

The thermal shock resistance and the magnetic flux density of Examples 12 to 14 were determined as described above. The results are shown in Table 4.

TABLE 4

|  |  | Example 12 | Example 13 | Example 14 |
|---|---|---|---|---|
| (A) Compound | Magnetic powder | $Sm_2Fe_{17}N_3$ | | |
|  | Resin | PA 12 | | |
|  |  | PA elastomer | | |
| (B) Rubber magnet particles | Magnetic powder | $Sm_2Fe_{17}N_3$ | | |
|  | Rubber | Silicone rubber | | |
|  | Size | 150 μm | 300 μm | 500 μm |
|  | Ratio (A)/(B) (w/w) | 100/5 | 100/5 | 100/5 |
|  | Timing to add (B) to (A) | Injection molding | Injection molding | Injection molding |
| Thermal shock resistance | Number of cracked samples | 0/10 | 0/10 | 0/10 |
| Magnetic flux density | Br (%) | 94 | 94 | 95 |

Table 4 shows that the composite components of Examples 12 to 14, which contain rubber magnet particles, exhibited further improved thermal shock resistance while maintaining the magnetic flux density.

Figure 1:
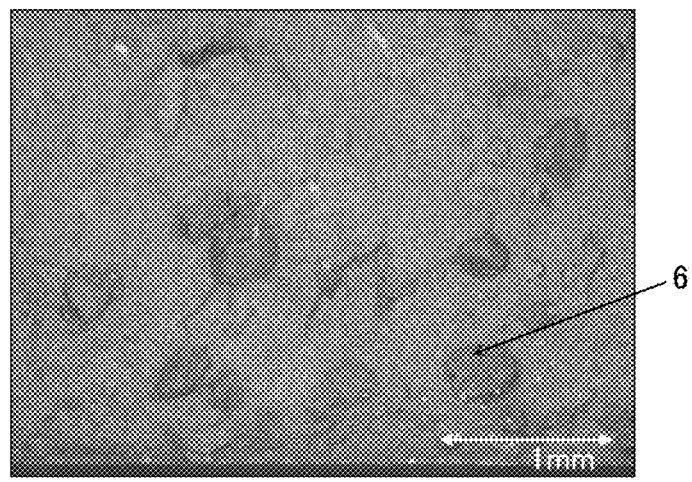
FIG. 1 shows a photograph of a cross-section of a bonded magnet according to an embodiment of the present disclosure.

FIG. 1 shows a photograph of a cross-section of the bonded magnet prepared in Example 7 taken with a light microscope. As shown in FIG. 1, in the bonded magnet containing a magnetic powder, a thermoplastic resin, and rubber magnet particles, a rubber magnet particle 6 was present as a particle.

These results show that, using a bonded magnet containing rubber particles allows for providing a composite component including a ring-shaped bonded magnet having good thermal shock resistance, and a method of manufacturing the composite component.

The composite components including a ring-shaped bonded magnet according to certain embodiments of the present invention may be used to provide rotating machines (e.g. motors) having good thermal shock resistance. Such rotating machines therefore can be suitably used as driving sources of fuel pumps for vehicles such as automobiles and motorcycles.

What is claimed is:

1. A composite component, comprising:
   a metal component having a substantially cylindrical shape or a substantially annular shape; and
   a ring-shaped bonded magnet disposed on an outer periphery of the metal component,
   the ring-shaped bonded magnet comprising a thermoplastic resin, magnetic particles, and rubber particles,
   wherein the rubber particles contain no magnetic material, and the amount of the rubber particles in the ring-shaped bonded magnet is 0.3% by mass or greater and 1.0% by mass or less.

2. The composite component according to claim 1,
   wherein each of the rubber particles comprises silicone rubber.

3. The composite according to claim 2,
   wherein an average particle size of the rubber particles is more than 0.7 µm and less than 1 mm.

4. A method of manufacturing the composite according to claim 3, the method comprising:
   kneading a thermoplastic resin with magnetic particles to obtain a compound; and
   integrally molding the compound and rubber particles with a metal component having a substantially cylindrical shape or a substantially annular shape.

5. A method of manufacturing the composite according to claim 2, the method comprising:
   kneading a thermoplastic resin with magnetic particles to obtain a compound; and
   integrally molding the compound and rubber particles with a metal component having a substantially cylindrical shape or a substantially annular shape.

6. The method according to claim 5,
   wherein the rubber particles are added in an amount of 0.3 parts by mass or greater and 1.0 parts by mass or less with respect to 100 parts by mass of the compound.

7. The composite component according to claim 1,
   wherein an average particle size of the rubber particles is more than 0.7 µm and less than 1 mm.

8. A method of manufacturing the composite according to claim 7, the method comprising:
   kneading a thermoplastic resin with magnetic particles to obtain a compound; and
   integrally molding the compound and rubber particles with a metal component having a substantially cylindrical shape or a substantially annular shape.

9. The method according to claim 8,
   wherein the rubber particles are added in an amount of 0.3 parts by mass or greater and 1.0 parts by mass or less with respect to 100 parts by mass of the compound.

10. The composite component according to claim 7,
    wherein an average particle size of the rubber particles is more than 2 µm and less than 1 mm.

11. A method of manufacturing the composite component according to claim 1, the method comprising:
    kneading a thermoplastic resin with magnetic particles to obtain a compound; and
    integrally molding the compound and rubber particles with a metal component having a substantially cylindrical shape or a substantially annular shape.

12. The method according to claim 11,
    wherein the rubber particles are added in an amount of 0.3 parts by mass or greater and 1.0 parts by mass or less with respect to 100 parts by mass of the compound.

13. A composite component, comprising:
    a metal component; and
    a ring-shaped bonded magnet disposed on an outer periphery of the metal component,
    the ring-shaped bonded magnet comprising a thermoplastic resin, magnetic particles, and rubber particles,
    wherein the rubber particles contain no magnetic material, and the amount of the rubber particles is 0.3% by mass or greater and 1.0% by mass or less, and
    wherein each of the rubber particles comprises a silicone rubber, and the thermoplastic resin comprises a polyamide resin.

14. A composite component, comprising:
    a metal component; and
    a ring-shaped bonded magnet disposed on an outer periphery of the metal component,
    the ring-shaped bonded magnet comprising a thermoplastic resin, magnetic particles, and rubber particles,
    wherein the rubber particles contain no magnetic material, and the amount of the rubber particles is 0.3% by mass or greater and 1.0% by mass or less, and
    wherein the ring-shaped bonded magnet further comprises rubber magnet particles containing magnetic particles.

* * * * *